Jan. 10, 1933.    R. M. DEANESLY    1,893,733
SEPARATION OF OLEFINES FROM PARAFFIN HYDROCARBONS
Filed Oct. 14, 1929
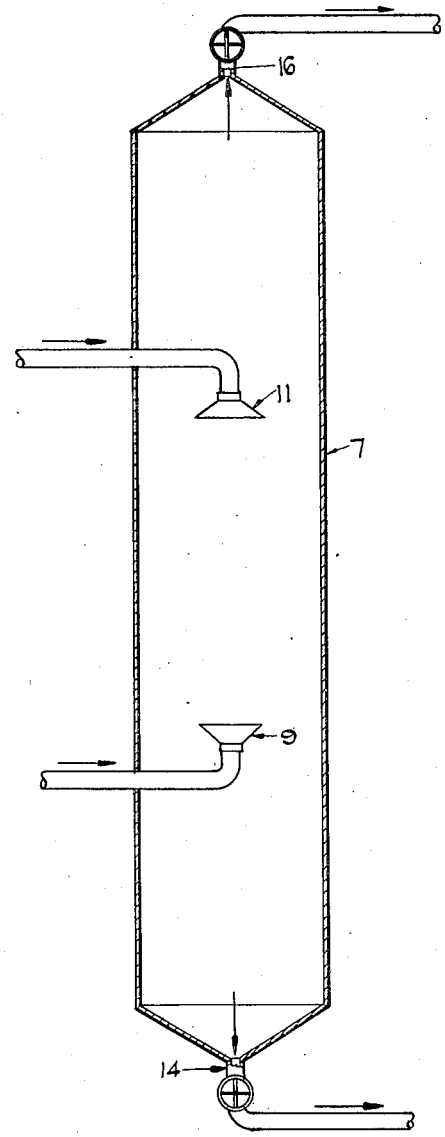
INVENTOR:
Richard M. Deanesly
BY HIS ATTORNEY:

Patented Jan. 10, 1933

1,893,733

UNITED STATES PATENT OFFICE

RICHARD M. DEANESLY, OF BERKELEY, CALIFORNIA, ASSIGNOR TO SHELL DEVELOPMENT COMPANY, OF SAN FRANCISCO, CALIFORNIA, A CORPORATION OF DELAWARE

SEPARATION OF OLEFINES FROM PARAFFIN HYDROCARBONS

Application filed October 14, 1929. Serial No. 399,539.

My invention relates to a process for the separation of liquid mixtures of hydrocarbons into their various components. Further my invention relates particularly to the separation of liquid mixtures whose components have such slight difference in vapour pressure as to make their separation by fractional distillation difficult if not practically impossible.

It is often desirable commercially to separate mixtures of paraffin and olefine hydrocarbons containing the same number of carbon atoms. The separation of such mixtures by fractional distillation is extremely difficult because of the similarity of vapour pressures of corresponding members of these series.

It is an object of my invention to provide a process for the separation of the components of a liquid mixture of hydrocarbons.

A further object of my invention is to provide a process for the separation of paraffin hydrocarbons from olefine hydrocarbons.

Another object of my invention is to provide an apparatus for carrying out the desired process.

Other objects of my invention will appear in the following description in which I will outline the preferred form of the treatment of hydrocarbons in accordance with my invention. It is to be understood that I do not limit myself to the form herein disclosed since the invention, as defined by the claims, is to be accorded a range of chemical and mechanical equivalents consistent with the state of the prior art.

The attached drawing illustrates diagrammatically the type of apparatus which I prefer to use in connection with my process, and the mode of its operation.

My invention is applicable to the separation of paraffin from olefine hydrocarbons in general, and particularly those which are liquid at about 0° C. or above; but to simplify the disclosure I shall confine my description to the separation of a mixture of the paraffin hydrocarbon butane from the olefine hydrocarbon butylene.

The process may be characterized as comprising the contacting of the mixture of hydrocarbons with a third liquid which has a preferential solubility for one of the hydrocarbons and which further is not greatly miscible with the other hydrocarbons under the conditions of the process. The result of contacting the hydrocarbon with such a third liquid, for brevity called the reagent, is that two liquid layers are formed, the one consisting of the reagent in which largely the hydrocarbon with preferential solubility in the reagent is dissolved, the other consisting largely of the other hydrocarbon. In fact, the separation is never complete since always part of the less soluble hydrocarbon passes into the reagent layer, while part of the more soluble hydrocarbon remains in the hydrocarbon layer. Further a small amount of the reagent dissolves in the hydrocarbon layer. If now the two liquid layers are separated and the liquid reagent is removed from each layer by any suitable means, it is found that the mixture of hydrocarbons recovered from the reagent layer is greatly enriched with respect to the component having preferential solubility in the reagent while the mixture of hydrocarbons recovered from the hydrocarbon layer is greatly impoverished with respect to that component. By suitable repetitions of the extracting process the separation of the two hydrocarbons may be carried to any desired limit. Such repetitions can conveniently be carried out by the operation of a plurality of treating towers arranged in series and operating in a countercurrent manner familiar to those skilled in the art.

In accordance with my invention, I conveniently employ such means as a column 7 for contacting the liquid hydrocarbon mixture with the reagent. As a reagent I prefer to use a solvent such as anhydrous ammonia which has a greater affinity for olefines than for paraffins. The tower 7 is provided with top and bottom outlets 16 and 14 for continuously drawing away the light and heavy layers respectively. The hydrocarbon mixture and the anhydrous liquid ammonia are continuously introduced in finely divided state by means of sprays at 9 and 11 respectively. Whichever is the heavier of the two liquids is introduced at the upper spray 11 while the lighter is introduced at 9. The surface of separation of the two layers in 7 lies approximately midway between 9 and 11. In the case of butane butylene hydrocarbons the hydrocarbon mixture is introduced at 9 and the ammonia at 11 since liquid ammonia has the greater specific gravity.

A countercurrent passage of hydrocarbon and reagent is thus effected. It is of course apparent to those skilled in the art that any other method or apparatus for countercurrent contacting of the two liquids can be employed.

A suitable space is left below spray 9 and above spray 11 in which the ammonia and hydrocarbon layers respectively settle out. Liquid from the two layers is continuously discharged through the appropriate outlets 14 and 16. Since in this instance the ammonia preferentially dissolves the butylene, the hydrocarbon layer consists largely of butane.

It is necessary in order that two layers shall be formed that the temperature of the tower be sufficiently low. In separating a mixture of 40 parts of butane and 60 parts of butylene in the manner described, I have found that the temperature within the column can be maintained between 60° and 105° F. with efficient results, though I prefer that for most efficient treatment the temperature be maintained between 80° and 90° F. It should be understood that the optimum temperature of treatment varies somewhat with the relative concentration of hydrocarbons in the mixture; the temperatures stated are those found suitable for the stated concentrations. The pressure in the tower is not less than that exerted by the vapours of the liquids in the tower which under the conditions specified is about 200 pounds per square inch. Under the conditions stated I have secured a desirable separation by using 100 parts of ammonia to 100 parts of the butane butylene mixture.

Under the described conditions and for an operating temperature of 68° F. I have found that the hydrocarbons dissolved in the ammonia layer consist of butylene and butane in the ratio of 73 to 27. By three repetitions of such countercurrent extraction I have found that the ratio of butylene to butane in the ammonia layer can be increased to 96 to 4. I have thus been able to obtain 96% butylene from an initial mixture containing only 60% butylene.

When the extraction is carried out at higher temperature a greater amount of butylene is dissolved per unit of ammonia, but this advantage is offset by a falling off in the ratio of butylene to butane dissolved. There is thus a gain in quantity but a loss in quality of the butylene extracted and the choice of operating temperature becomes a matter of economic expedience depending largely upon the purity of the products finally desired.

My invention is readily applicable to the separation of other members of the paraffin and olefine series particularly of those which have higher boiling points than butylene and butane. Some changes are however expediently made in conformity with the characteristics of the particular hydrocarbons treated. For example in the separation of pentane and amylene the preferred temperature of operation is 20° to 30° F. higher than that recommended for the separation of butane and butylene. Further, greater settling spaces are provided in the tower because there is less difference in specific gravity between ammonia and pentane than between ammonia and butane. Alternatively I have found that the rate of settling can be increased by dissolving some substance in the ammonia in order to increase its specific gravity.

The two layers withdrawn from the tower may be freed from ammonia by distillation followed by a final extraction of ammonia from the hydrocarbon with water. Alternatively the ammonia may be removed by washing with water directly without previous distillation. Alternatively the hydrocarbon ammonia mixtures may be used as feed for the distillation process described in U. S. Patent application 368,612. In any case the ammonia can ultimately be recovered, by known methods in anhydrous form and used again for the process.

I claim:

1. A process for the separation of olefines from a mixture containing olefine and paraffin hydrocarbons comprising extracting the mixture with liquid anhydrous ammonia under such conditions that the ammonia forms a liquid layer separate from the hydrocarbon mixture, thereafter removing the ammonia layer and recovering from it the extracted olefines.

2. A process for the separation of olefines from a mixture containing olefine and paraffin hydrocarbons comprising effecting a counter-current contacting of the hydrocarbon mixture with liquid anhydrous ammonia under such conditions that the ammonia forms a liquid layer separate from the hydrocarbon mixture, thereafter removing the ammonia layer and recovering from it the extracted olefines.

3. A process for the continuous separation of olefines from a mixture containing olefine and paraffin hydrocarbons comprising continuously extracting the mixture with liquid anhydrous ammonia under such conditions that the ammonia forms a liquid layer separate from the hydrocarbon mixture, continuously removing the ammonia layer and subjecting it to further extraction and finally recovering from the ammonia layer the extracted olefines.

4. A process for the separation of butene from a mixture containing butene and butane comprising extracting the mixture with liquid anhydrous ammonia under such conditions that the ammonia forms a liquid layer separate from the hydrocarbon mixture, thereafter removing the ammonia layer and recovering from it the extracted butene.

5. A process for the separation of olefines from a mixture containing olefine and paraffin hydrocarbons comprising contacting the mixture in a finely divided state with liquid anhydrous ammonia under such conditions that the ammonia forms a liquid layer containing extracted olefines separate from the hydrocarbon mixture, thereafter removing the ammonia layer and recovering from it the extracted olefines.

6. A process for the separation of olefines from a mixture containing olefine and paraffin hydrocarbons comprising contacting the mixture in a finely divided state with liquid anhydrous ammonia, also in a finely divided state, under such conditions that the ammonia forms a liquid layer containing extracted olefines separate from the hydrocarbon mixture, thereafter removing the ammonia layer and recovering from it the extracted olefines.

7. A process for the separation of olefines from a liquid mixture containing olefine and paraffin hydrocarbons comprising contacting the liquid mixture in a finely divided state with liquid anhydrous ammonia, also in a finely divided state, under such conditions that the ammonia forms a liquid layer containing extracted olefines separate from the hydrocarbon mixture, thereafter removing the ammonia layer and recovering from it the extracted olefines.

In testimony whereof, I have hereunto set my hand.

RICHARD M. DEANESLY.